United States Patent [19]

Caney

[11] 4,343,474

[45] Aug. 10, 1982

[54] MULTIPLE GAME DEVICE

[76] Inventor: Steven Caney, P.O. Box 51, Carlisle, Mass. 01741

[21] Appl. No.: 151,133

[22] Filed: May 19, 1980

[51] Int. Cl.³ .......................... A63F 3/00; G09B 7/00
[52] U.S. Cl. .................................. 273/237; 273/240; 273/284; 434/339
[58] Field of Search .................. 273/237, 240, 153 R; 434/338, 339, 117, 224

[56] References Cited

U.S. PATENT DOCUMENTS

| | | | |
|---|---|---|---|
| 2,889,634 | 6/1959 | Bringmann | 273/265 X |
| 3,541,706 | 11/1970 | Shapiro | 434/117 |
| 3,947,978 | 4/1976 | Clark et al. | 434/339 |
| 4,006,903 | 2/1977 | Barish | 273/237 |
| 4,103,895 | 8/1978 | Pressman et al. | 273/153 R |
| 4,116,449 | 9/1978 | Breslow | 273/240 |

FOREIGN PATENT DOCUMENTS 534452  1/1955  Belgium ............................ 273/237

Primary Examiner—Richard C. Pinkham
Assistant Examiner—Scott L. Brown

Attorney, Agent, or Firm—Howard C. Miskin

[57] ABSTRACT

An electronic multiple game device includes a body member having a main well and battery and circuit housing wells. A game board separably includes a bottom substrate having imprinted interdigitaling branched first and second contacts, an indexed paper program panel overlying the substrate and adapted to be conductively marked at selected areas to provide bridge conductors which, when pressed, complete a circuit between the contacts, a game representing paper panel overlying the program panel and an erasable pencil markable transparent flexible plastic panel overlying the game panel. A transistorized switch circuit which can be preassembled or assembled by the user includes the LED in its output and its input is connected between the contacts, the circuit including a punched PC board or peg board with the circuit component leads engaging proper peg board apertures and locked and interconnected by cup shaped brass plugs engaging the lead occupied apertures. Each of the paper sheets is replaceable and the program sheet may be pencil marked as desired and reoriented.

9 Claims, 9 Drawing Figures

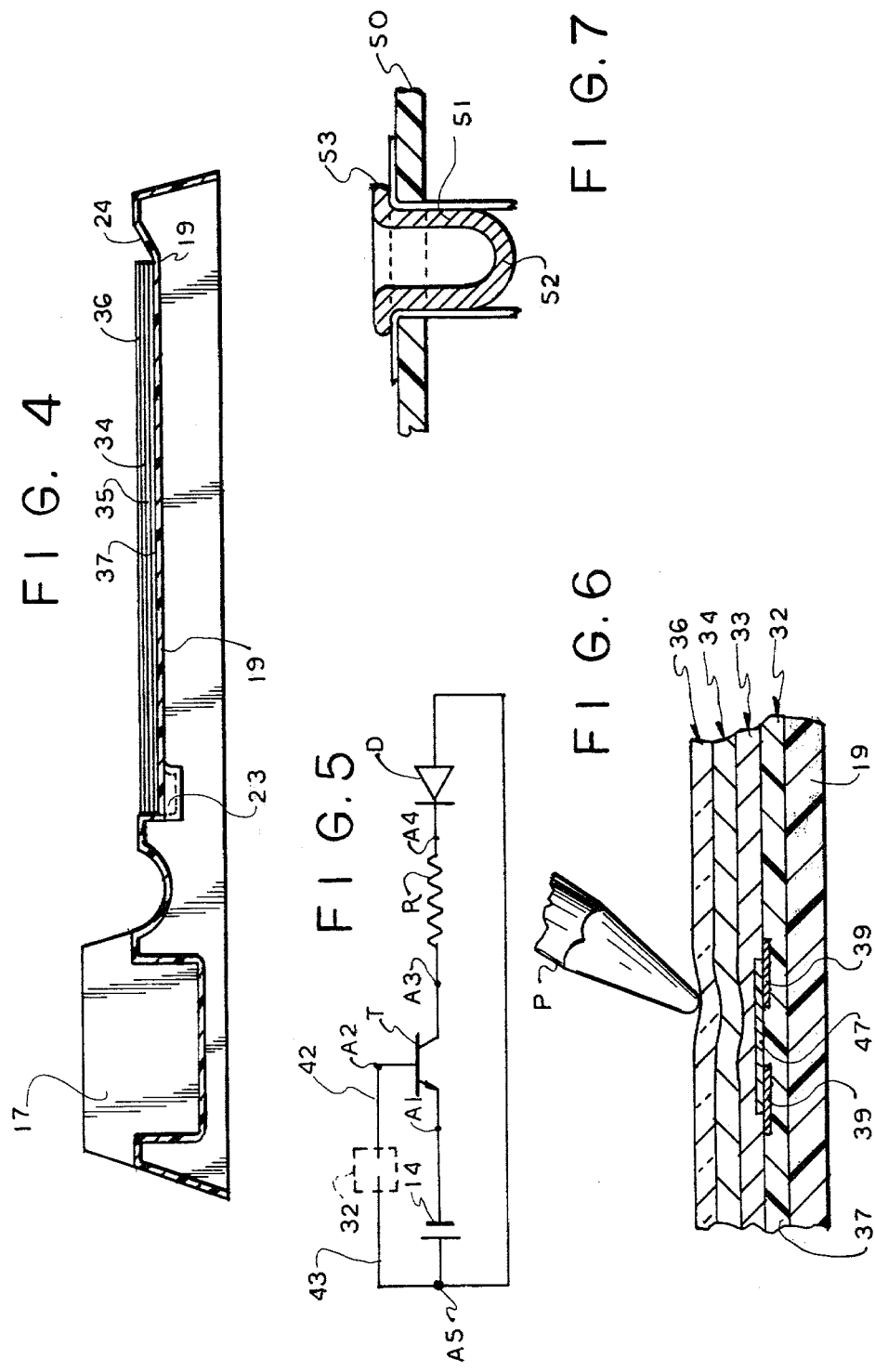

MULTIPLE GAME DEVICE

BACKGROUND OF THE INVENTION

The present invention relates generally to improvements in programmable game devices and it relates more particularly to an improved easily assembled educational and entertaining electronic multiple game device.

A common type of electrical game or educational device which has been heretofore available or proposed in many forms includes a multiple choice selector which if properly positioned, completes the energizing circuit to an electrically actuated signal device such as a sounder or lamp to indicate the proper selection. While some of these game devices employ replaceable question and answer or game cards, they possess fixed programs so that independently of the question and answer or game card used, the selection pair combinations remains the same and unaltered, thereby greatly limiting the application of such devices and restricting their versatility. Moreover, these game devices must be factory assembled since their assembly requires a high degree of skill and the use of special tools not normally available or usable by those normally employing these game devices. Such prior art games can, therefore, only be programmed by their manufacturers. Thus, the conventional basic electrical multiple choice game device possesses, in addition to the above, many drawbacks and disadvantages as an educational construction and entertainment device and leaves much to be desired.

SUMMARY OF THE INVENTION

It is a principle object of the present invention to provide an improved game device.

Another object of the present invention is to provide an improved easily assembled electronic game device.

Still another object of the present invention is to provide an improved electronic multiple game device.

A further object of the present invention is to provide an improved selectively programmable electronic multiple game device which may be easily assembled without the need for special tools or skills.

Still a further object of the present invention is to provide such a game device which is user programmable.

Still a further object of the present invention is to provide an improved game device of the above nature characterized by its reliability, ruggedness, simplicity, low cost and great versatility and adaptability.

The above and other objects of the present invention will become apparent from a reading of the following description taken in conjunction with the accompanying drawings which illustrate a preferred embodiment thereof.

A game device according to the present invention comprises a solid state switch including a controlled output and a voltage responsive input, a voltage source, an electrically actuated signal member connected through the switch output across the voltage source, a contact member including an insulating substrate first panel having along its upper face a pair of spaced conductors defining a plurality of pairs of equally spaced, electrically separate contact sections the conductors being coupled to respective terminals of the switch input, and a program member including a pliable second insulating panel superimposed on the first panel and having on its under face conducting sections bridging and either lightly engaging or separated by insulating spacers from preselected pairs of contact sections and being responsive to the downward deflection of the second panel in the area of a bridging conductor. In one embodiment of the invention, as shown in FIGS. 1, 4 and 6, wherein there is a normally high resistance interface at the points of contact between the bridging and contact sections, the downward deflection of the second panel under pressure reduces the interface resistance until the voltage applied to the switch input is sufficient to activate the switch and energize the signal member. In another embodiment, wherein the bridging and contact sections are separated by insulating spacers, the downward deflection of the second panel under pressure causes the bridging sections to engage the adjacent conducting sections between spacers thereby completing a circuit between the voltage source and switch input to actuate the switch.

In one preferred form of the game device, the program panel is a paper sheet adapted to be indexed by the user in any of numerous ways to correspond to contact pairs and the bridging conductors are pencil marks applied to preselected indicia defining areas on the program panels. In addition, a game representation carrying second paper panel is superimposed on the first paper panel and an erasable pencil mark accepting flexible plastic panel is superimposed on the second paper panel. The panels in the preferred embodiment, herein described, are square and separable and are assembled to form a game board which can optionally be nested in a well in a base member. The panels, however, need not be square, and it will be apparent that other geometries can be adapted for use within the teachings of the invention. The conductors on the substrate, each include equally transversely spaced arms which medially interdigitate the arms of the other conductor. The solid state switch can be a transistor mounted on a peg board which also supports a resistor, a battery coupling and a light emitting diode whose leads together with those from the substrate conductors engage apertures in the peg board and are locked in the apertures and are electrically connected by cup shaped metal plugs engaging the apertures to form the solid state switch circuit and connect it to the light emitting diode (or other signal device, e.g., a light bulb, bell, buzzer or audible oscillator) and voltage source battery. (As used in the disclosure and claims, the term "voltage source" includes current sources, as well.) A flasher or oscillating interrupter circuit can also be added to cause the diode to or other signal device to flash or sound intermittently when energized.

The improved game device is easy to assemble without the need for tools or special skills, is simple, inexpensive, reliable and rugged and is of great versatility and adaptability.

BRIEF DESCRIPTION OF THE DRAWINGS

FIG. 4 is a sectional view taken along line 4—4 in FIG. 2;

FIG. 5 is a circuit diagram of the device;

FIG. 6 is an enlarged fragmentary sectional view of the game board portion of the device showing the electrical bridging of a contact pair;

FIG. 7 is an enlarged framgentary sectional view of the solid state switch device employed therein, showing the coupling and locking of a pair of component leads;

DESCRIPTION OF THE PREFERRED EMBODIMENT

Figure 1:
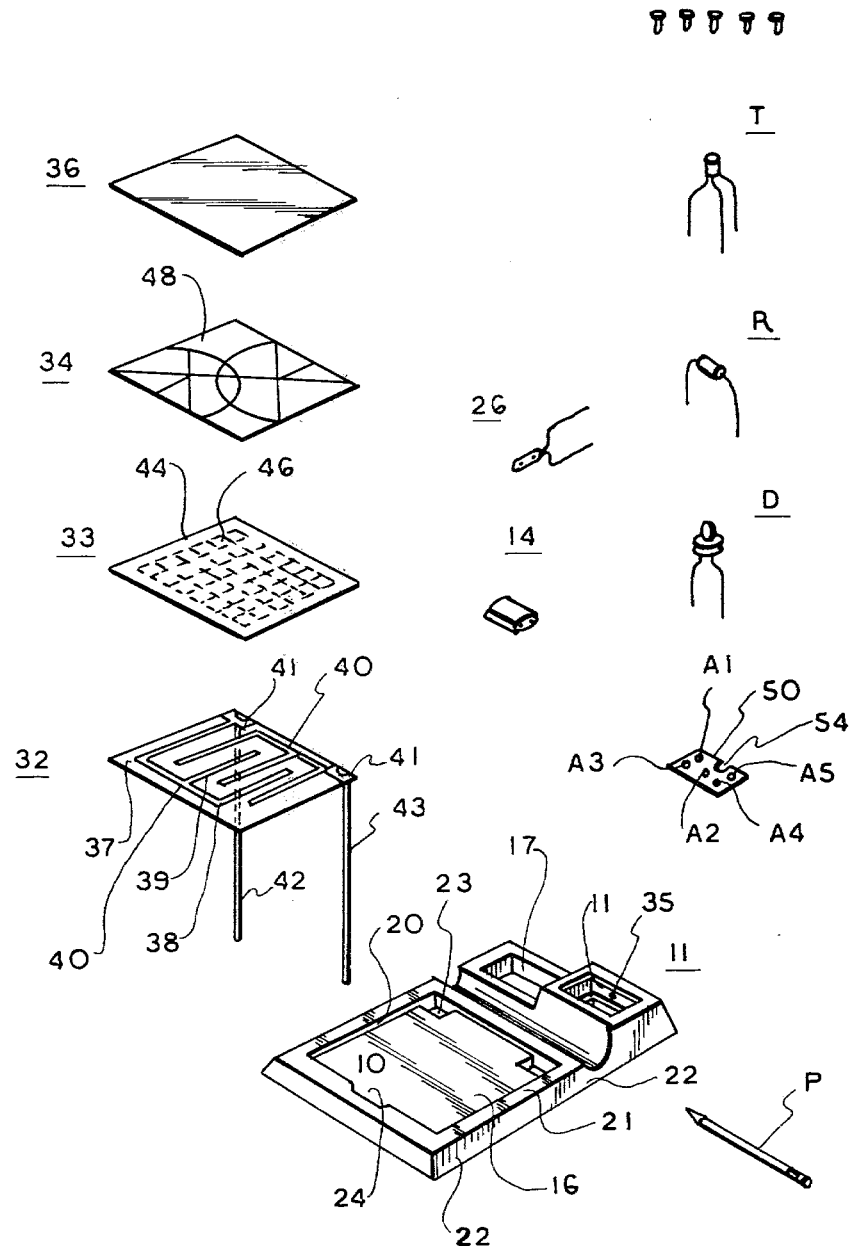
FIG. 1 is an exploded perspective view of the improved game device showing the components entering into the assembly thereof.
Figure 2:
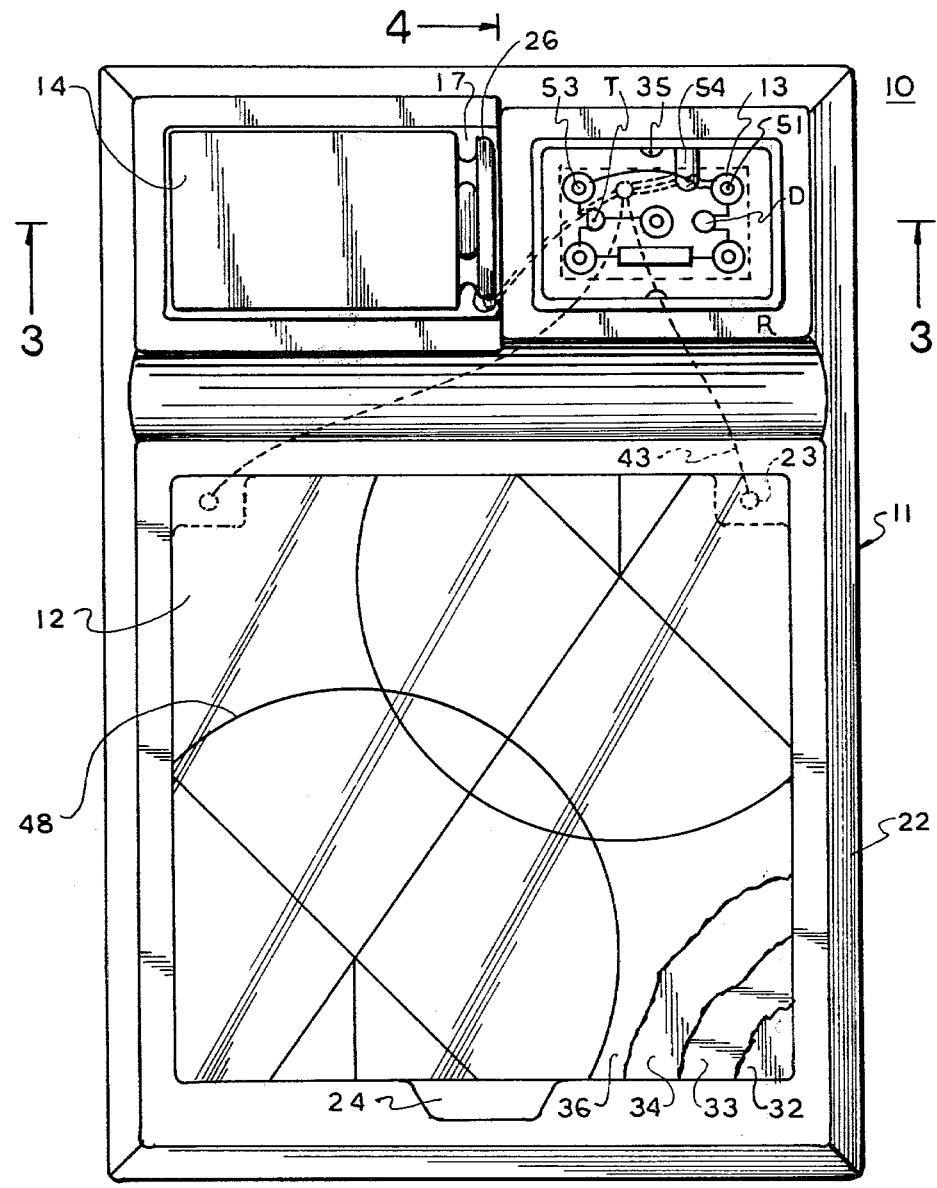
FIG. 2 is a top plan view of the assembled device.
Figure 3:
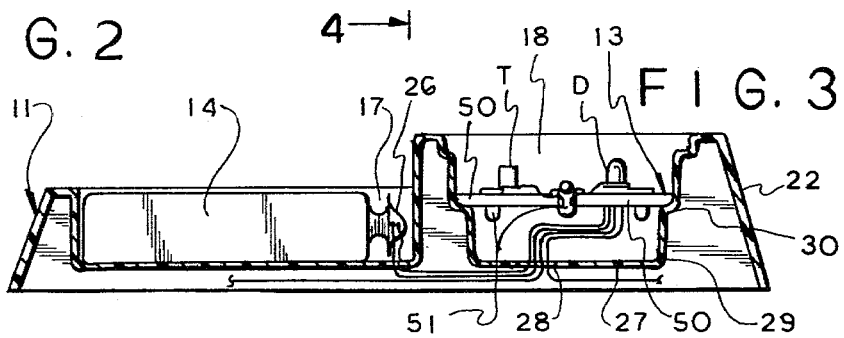
FIG. 3 is a sectional view taken along line 3—3 in FIG. 2.

Referring now to the drawings which illustrate a preferred embodiment of the present invention, the reference numeral 10 generally designates the improved game device which includes a base body member 11, a game board 12, a semiconductor or solid state switch and indicating device 13 and a replacable battery 14. In the marketing and distribution of the game device 10, it may be packaged in unassembled condition with simple instructions for its assembly which may be easily properly performed with only the aid of a pencil P and with a minimum of skill.

The base member 11 is formed of a synthetic organic polymeric resin, such as by thermoforming polymeric resin sheet or by other suitable process and includes a front shallow square game board positioning well 16 and side by side rear battery housing and switch circuit housing rectangular wells 17 and 18 respectively. The well 16 includes a square bottom wall 19 with upstanding peripheral walls 20 along its edges joining a horizontal peripheral border wall 21 which joins a downwardly outwardly inclined peripheral skirt wall 22 extending about base member 11. Centrally apertured depressions 23 are formed in the rear corners of well bottom wall 19 and a finger accommodating recess 24 with an inwardly inclined bottom wall is medially formed at the junction of the front horizontal and vertical walls 20 and 21.

Battery well 17 is of size and shape to nest a conventional battery 14 which, in the preferred embodiment of the invention, is a standard 9 volt battery, but which can be another battery depending on the selected circuit parameters as will be known to those skilled in the art, and a battery coupling 26. A switch housing well 13 includes a rectangular bottom wall 27 having an access opening 28 and being coplanar with the bottom wall of battery well 14 and above the level of the bottom edge base peripheral well 22. Projecting upwardly from the edges of well bottom wall 27 is a multiple stepped peripheral wall 29, the bottom step of which terminates at its top in a peripheral shoulder 30 and the top step of which terminates in a horizontal peripheral flange.

The game board 12 nests in the well 16 and rests on and substantially coincides with well bottom wall 19 and includes four separably superimposed square panels, a bottom contact panel 32, a program panel 33 superimposed on panel 32, a game panel 34 superimposed on panel 33 and a transparent pencil markable panel 36 superimposed on panel 34. Other variations are possible within the scope of the invention. For example, the panel 36 can be omitted with markings made directly on the game panel 34.

The contact panel 32 is formed of a preferably relatively stiff insulating substrate 37 having affixed to or formed on the top face thereof preferably but not necessarily by conventional printed circuit or other suitable procedures, a pair of electrically separate conductor members 38 whose top faces are substantially coplanar with the top face of substrate 37 and which define a plurality of a pair of transversely spaced switch contacts. Each of conductor members 38 includes a plurality of equally transversely spaced longitudinally extending flat arms 39, the arms 39 of each conductor member 38 medially interdigitating the arms of the other conductor member and the corresponding ends of one set of arms 39 being joined by an integrally formed conductor cross leg 40 and the opposite ends of the other set of arms 39 being likewise joined by a cross leg 40. Each of the conductor members 38 is connected by a leg to a corresponding junction 41 at a respective rear corner of substrate 37 and a pair of conductor leads 42 and 43 are connected to the respective junctions 41.

Program panel 33 is formed of a pliable material, preferably paper and can have imprinted on a face thereof so as to be visible at its underface, suitable indicia 44, advantageously a plurality of equally spaced transversely and longitudinally extending orthogonally related lines which form a square delineating grid, the distance between adjacent parallel lines being equal to the center to center distance between adjacent conductor arms 39, the longitudinally extending indicia lines extending medially of respective arms 39 when the panel 33 coincides with the underlying panel 32. The indicia 44 can also be printed on a separate sheet which is visible through program panel 33 to define regions for forming bridging elements in program panel 33. Other spacings for the indicia 44 can be selected provided that they define regions which span pairs of conductor arms 39 respectively connected to opposite conductor leads 42 and 43. To prepare the game board 12 for use, preselected or desired indicia delineated squares 46 can be filled in by the user with a conventional, preferably soft lead pencil to provide respective shorting or bridging elements 47 on the underface of panel 33, each bridging element having its opposite borders registering with a corresponding pair of contact defining sections of adjacent conductor arms 39 and in the normal unstressed condition of the area of panel 33 registering with the respective shorting element any interface contact between bridge element 47 and conductor arms 39 being of a very high resistance. (The panel 33 can be premarked by the manufacturer with a conductive coating if user programming is not to be required.) However, the inward deformation of such area due to suitable pressure applied thereto, such as at its center, by a pencil or the like, greatly reduces such interface electrical resistance to thereby close the circuit between the conductors 38.

Figure 8A:
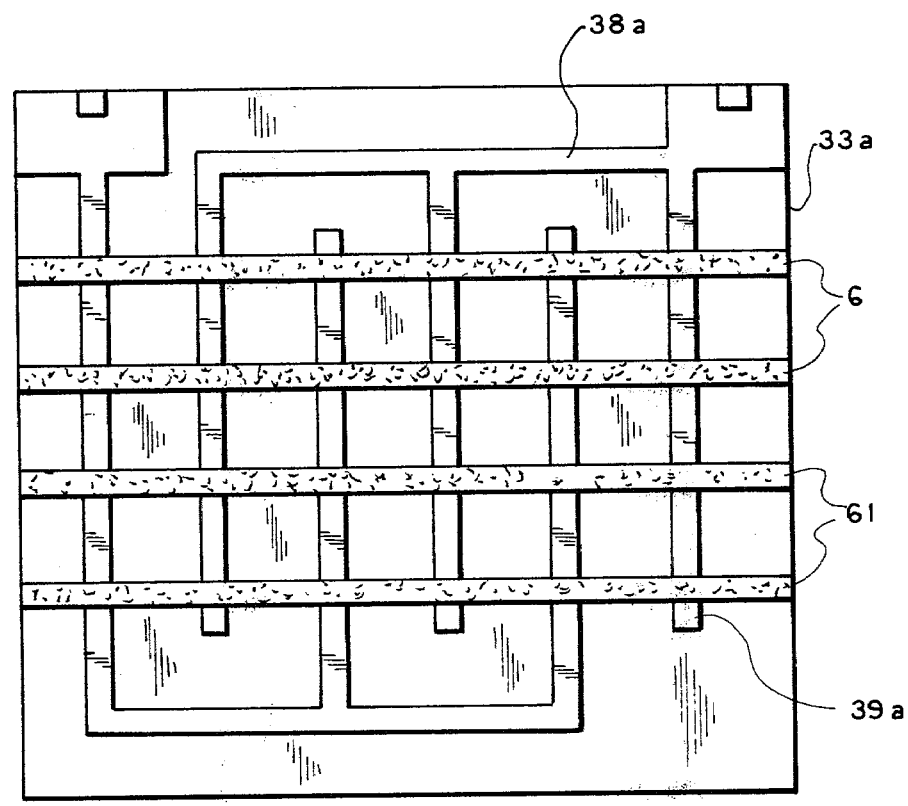
FIG. 8A is a plan view of a contact panel 32a used in an alternate embodiment of the invention.
Figure 8B:
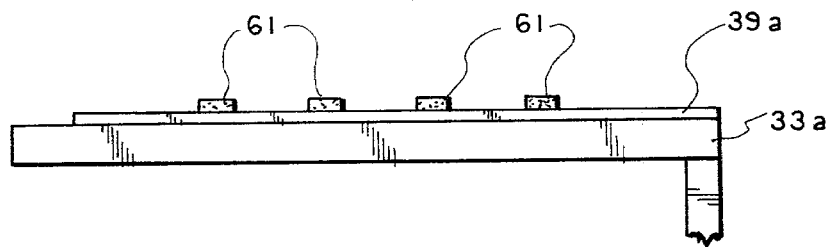
FIG. 8B is an elevation view of the contact panel 32a used in the alternate embodiment of the invention.

In an alternate embodiment of the invention, a contact panel 32a, as shown in FIGS. 8A and 8B, can have a grid of insulating spacer elements 61 laminated over the panel 32a and having an elevation greater than the elevation of the conductor arms 39a. The spacer elements can take the form of equidistant parallel lines running transverse to the conductor arms 39a. The conductor members 38a and arms 39a can be formed by coating the surface of the contact panel 32a with lines of carbon conductive ink. The spacer elements can be formed from an insulation coating which can be applied over portions of the carbon conductive inks lines and/or which can be thicker than the carbon conductive ink lines to give the spacer grid a higher elevation than the conductor members 38a and arms 39a and thereby prevent contact between the bridge elements 47 coated onto the program panel 33a and the conductor arms 39a, except where local pressure is applied to the program panel 33a.

The game panel 34 is likewise formed of paper or other suitable pliable material and has a game related representation 48 formed on its top face. The top panel 36 is flexible and preferably transparent or highly translucent and may be formed of a plastic sheet or film and its top face is of a nature to be erasably marked by a conventional lead pencil and to this end may be lightly frosted or otherwise treated.

The indicator and semiconductor switch network includes battery 14, a transistor T, a resistor R and a light emitting diode D. The battery 14, light emitting diode D and resistor R are connected in series, properly oriented, between the emitter and collector of a transistor T and the base of transistor T is connected to its emitter through battery 14.

In order to facilitate the easy assembly of the circuit network 13, there are provided a rectangular insulating apertured circuit board or peg board 50 resting on shoulder 30 and retained in position by dimples 35 formed on opposing walls 29 above shoulder 39 and having five circular apertures A1 to A5 and a lead locking connector brass plug 51 of cup shaped configuration with a convex bottom 52 and a top peripheral flange 53 for each of the apertures. A recess passageway lead 54 is provided along a border of board 50. The contact board leads 42 and 43, the leads of the battery coupling 26, resistor R, transistor T and light emitting diode D are suitably sized and trimmed and inserted into registry with the apertures of circuit board 50 as follows: aperture A1 is engaged by a lead from the negative terminal of battery coupler 26 and the transistor emitter lead, A2 is engaged by the transistor base lead and contact board lead 42, A3 is engaged by one resistor lead and the transistor collector lead, A4 by the light emitting diode cathode and the other resistor lead and aperture A5 by the light emitting diode anode lead, the battery coupler positive lead and contact board lead 43. The leads in respective apertures A1 to A5 are locked in position and electrically interconnected by corresponding plugs 51 fully inserted into the respective openings with the aid of the tip of a pencil or the like. The leads 42 and 43 extend from contact panel 37 through apertures in corner walls 23, aperture 28 in wall 27 and circuit board recess 54 and the battery coupler leads extends through an apertures in the battery well bottom wall, aperture 28 and recess 54. The procedure for assembling the game is simple and apparent from the above. Instead of connecting the diode leads directly to terminals A4 and A5, the diode leads can be connected to the output leads of a conventional flasher or oscillating circuit interrupter having input leads connected to the terminals at A4 and A5. This will cause the diode D to flash on and off when a low resistance circuit is completed between A2 and A5.

In the application and operation of the improved assembled game device described above, a participant marks a selected area of plastic panel 36 in accordance with game plan 48 by means of pencil P and if the area of the applied mark registers with a bridge element 47, the bridge element 47 is depressed and the interface resistance between the bridge element 47 and the bridge connector arms 39 is sharply reduced to sufficiently short the conductor members 38 whereby to apply a signal to the base of transistor T to sharply decrease its output resistance and increase the current flow therethrough to energize and illuminate light emitting diode D. To change the game, panel 34 may be replaced by other panels carrying other game representations and to change or supplement the game programming the orientation of the program panel 33 may be altered by rotation in angular increments (e.g., 90 degrees in the square embodiment illustrated in FIG. 1), different or additional penciled bridging elements 47 may be applied to the program panel 33 or the program panel may be replaced by another program panel. The program panel 33 can be round or hexagonal. (In the latter case, the panel could be rotated in 60 degree increments.)

While there has been described and illustrated a preferred embodiment of the present invention, it is apparent that numerous alterations, omissions and additions may be made without departing from the spirit thereof.

I claim:

1. A game device comprising a semi-conductor switch including a controlled output and a resistance responsive control input, a source of voltage, an electrically actuated signal member connected through said switch output across said source of voltage, a contact member including a first insulating panel having a pair of separate conductor members located along a first face thereof and defining a plurality of pairs of opposing, regularly spaced electrically separate contact sections, means connecting said conductor members to said switch input and a program member including a pliable second insulating panel superimposed on said first panel and having a first inside face thereof confronting said first panel, said first face of said second insulating panel having conducting sections bridging and engaging predetermined pairs of said contact sections and normally having relatively high electrical resistance interfaces with said predetermined pairs of contact sections and being responsive to pressure applied to the outside face of said second panel in the area of a conducting section to sufficiently reduce the resistances at said interfaces between said conducting section and said contact sections to actuate said switch and energize said signal member, said conducting sections comprising lead pencil marks occupying corresponding areas of said second panel first face.

2. The game device of claim 1 wherein said contact member conductor members comprises a first set of equally transversely spaced longitudinally extending electrically interconnected first arms and a second set of equally transversely spaced longitudinally extending electrically interconnected second arms parallel to and medially interdigitate said first arms.

3. The game device of claim 2 wherein said second panel has a plurality of pairs of indicia formed on its inside face, the distance between the indicia of each pair corresponding to that between adjacent conductor arms and conducting sections extending between the indicia of preselected pairs thereof.

4. The device of claim 3 wherein said indicia are longitudinally and transversely orthogonally arranged.

5. The device of claim 1 wherein said panels are of similar rectangular configuration and further comprising a body member having a well corresponding in outline to said panels, said panels individually separably nesting in said well in superimposed arrangement.

6. The device of claim 5 including applicable third panel separably superimposed on said second panel and having a game pattern imprinted thereon.

7. The device of claim 6 including a flexible light transmissive fourth panel separably superimposed on said third panel and having an erasable lead pencil mark receiving face.

8. The device of claim 7 wherein said second and third panels are formed of paper and said fourth panel is formed of a synthetic polymeric resin.

9. The game device of claim 1 wherein said signal device includes a light emitting diode and said semiconductor switch includes an insulating peg board, a transistor having emitters base, and collector leads engaging first, second and third openings in said pegboard, said light emitting diode engaging fourth and fifth openings in said pegboard, a resistor having leads engaging said third and fourth openings, said contact member including a pair of leads respectively engaging said second and fifth openings, a battery coupling member having a pair of leads engaging said first and fifth openings, and conductive locking plugs engaging each of said first to said fifth openings.

* * * * *